United States Patent [19]
Jacob

[11] Patent Number: 4,950,206
[45] Date of Patent: Aug. 21, 1990

[54] CONSTANT VELOCITY RATIO UNIVERSAL JOINTS

[75] Inventor: Werner Jacob, Frankfurt am Main, Fed. Rep. of Germany

[73] Assignee: Uni-Cardan AG, Siegburg, Fed. Rep. of Germany

[21] Appl. No.: 275,077

[22] Filed: Nov. 22, 1988

[30] Foreign Application Priority Data

Nov. 25, 1987 [DE] Fed. Rep. of Germany ....... 3739867

[51] Int. Cl.[5] .............................................. F16D 3/223
[52] U.S. Cl. .................................. 464/140; 464/145; 464/167; 464/906
[58] Field of Search ............... 464/140, 145, 146, 162, 464/167, 906

[56] References Cited

U.S. PATENT DOCUMENTS

| Re. 30,606 | 5/1981 | Sharp | 464/140 X |
| 1,022,909 | 4/1912 | Whitney | 464/167 X |
| 4,116,020 | 9/1978 | Aucktor et al. | 464/145 |
| 4,300,651 | 11/1981 | Krude | 464/140 X |
| 4,608,028 | 8/1986 | Welschof et al. | 464/145 |

FOREIGN PATENT DOCUMENTS

| 122351 | 4/1931 | Austria . | |
| 243029 | 10/1965 | Austria . | |
| 2461289 | 11/1975 | Fed. Rep. of Germany | 464/145 |
| 3233753 | 3/1984 | Fed. Rep. of Germany . | |
| 3343794 | 6/1985 | Fed. Rep. of Germany | 464/140 |
| 125343 | 9/1979 | Japan | 464/145 |
| 2106218 | 4/1983 | United Kingdom | 464/145 |

*Primary Examiner*—Daniel P. Stodola
*Attorney, Agent, or Firm*—Toren, McGeady & Associates

[57] ABSTRACT

A constant velocity ratio universal joint comprising an outer joint member (1), an inner joint member (2), a cage (8), and a plurality of torque-transmitting balls (7) engaged in grooves (4, 6) of the outer and inner joint members for transmitting torque therebetween. The grooves in the outer joint member are of non-undercut configuration considered from an end (13) of the outer joint member, as also is the internal surface of the outer joint member between the grooves thereof. Adjacent the end (13) of the outer joint member the inner surface of the cage is also of non-undercut configuration. The joint members and cage have engaging part-spherical surface portions which are held in engagement by a support surface (14) provided in association with a closure member (15) closing the outer joint member at its end (13), the support surface (14) engaging a part-spherical surface (5) at the end of the inner joint member.

12 Claims, 5 Drawing Sheets

CONSTANT VELOCITY RATIO UNIVERSAL JOINTS

BACKGROUND TO THE INVENTION

1. Field of the Invention

This invention relates to a constant velocity ratio universal joint for torque transmission, comprising:

a hollow outer joint member having an internal surface with a number of grooves circumferentially spaced about the axis of rotation of the joint member and extending in meridian planes;

an inner joint member disposed at least partially within the outer joint member and having an outer surface with a number of grooves circumferentially spaced about the axis of rotation of the joint member in meridian planes facing the grooves of the outer joint member in pairs, all the grooves in the joint members being undercut free;

a plurality of balls received one in each facing pair of grooves in the joint members for torque transmission therebetween;

the internal surface of the outer joint member between the grooves thereof being non-undercut, considered from one end of the member at which end the member has an internal diameter larger than at its other end, and including a part-spherical surface portion;

the outer surface of the inner joint member between the grooves thereof having a part-spherical portion;

and a cage of annular form disposed between the inner and outer joint members and having inner and outer part-spherical surface portions engaging said part-spherical surface portions of the inner and outer joint members, the cage holding the balls so that their centres occupy a plane guided to bisect the angle between the rotational axes of the inner and outer joint members. Such a constant velocity ratio universal joint will hereafter be referred to as a constant velocity ratio universal joint of the kind specified.

b 2. Description of Prior Art

A constant velocity ratio universal joint of the kind specified is disclosed in DE No. -2522670(GB No. 1553369). Both the ball-receiving grooves and the internal surface of the outer joint member therebetween, engaging the part-spherical outer surface of the cage, are of undercut-free configuration considered from one end of the outer joint member. The cage has a part-spherical internal surface which engages and axially fixes the cage relative to a part-spherical external surface of the inner joint member between the grooves thereof. The cage engages a separate guiding surface associated with the outer joint member. In such a joint, axial forces are transmitted in both directions between the joint members through the intermediary of the cage. Assembly of the cage to the inner joint member requires these parts to be placed in such a relative position that the inner joint member cannot be integral with a shaft part because the presence of the shaft part would interfere with the assembly operation, and hence a shaft part for transmitting torque to the inner joint member must be a separate component. This in turn requires the inner joint member to be provided with a bore for receiving a shaft component, and the inner joint member has to be of relatively large size to ensure that it has sufficient material for strength. Finally, close production tolerances are required in order to avoid noise during torque reversals and overloading of the cage, the latter requiring the radial thickness of the cage to be increased. It is not possible to produce the outside shape of the inner joint member and the inside shape of the cage without metal removal by machining the relevant surfaces of the components.

SUMMARY OF THE INVENTION

It is broadly the object of the present invention to provide a constant velocity ratio universal joint of the kind specified which, compared with the examples thereof above described, is capable of providing a higher torque transmitting capacity for the same size joint, does not require such tight production tolerances, and is able to be produced by forming processes not requiring removal of material by machining.

According to the present invention, we provide a constant velocity ratio universal joint of the kind specified wherein:

the outer joint member is closed at said one end by a closure member;

the inner joint member, at its end adjacent said one end of the outer joint member, has a part-spherical end surface engaged by a complementary support surface provided in association with said closure member; and the inner surface of the cage comprises said part-spherical portion which is engaged with the part-spherical surface portion of the inner joint member adjacent its other end, and which leads into a cavity extending to the end of the cage adjacent said one end of the outer joint member, said cavity having a size at least equal to the maximum diameter of the part-spherical inner surface portion of the cage and being undercut free considered from said end.

Preferably the inner joint member is integral with a journal or shaft element.

In a joint according to the invention, by supporting the inner joint member directly on a part-spherical surface provided in association with the closure member closing the outer joint member, the above described situation in a previously known joint, whereby axial forces in both directions must be transmitted through the cage, is avoided. Tolerances can be made less tight, since adjustment to ensure the part-spherical end surface of the inner joint member correctly engages the support surface is possible by selective use of spacers when the closure member is secured to the outer joint member. Alternatively, the support surface may be provided on a separate supporting member, which is spring loaded relative to the closure member by resilient means. All the components of the joint are undercut free (except if an undercut relief is provided as hereafter described in the inner surface of the cage), and hence may be made by forming processes not involving metal removal. Additionally, assembly of the joint is simplified because all parts thereof can simply be fitted to one another in the axial direction.

Furthermore, when the inner joint member is integral with a shaft member or a connecting journal, the required radial size of the inner joint member can be relatively reduced. Alternatively, for a joint member of the same size as in the known joint above described, the torque capacity can be relatively increased. The method of axial assembly of the components of the joint permits the integral design of the inner joint member. In addition, because of the reduced dimensions of the joint, it may advantageously be used in part of an integrated wheel bearing assembly.

The ability to articulate a joint according to the invention from the aligned condition without resistance and without any tendency to self-locking at a particular angle is improved if the inner surface of the cage is provided with an undercut relief in a transition region between the part-spherical portion and the cavity thereof.

Such an undercut relief would be dimensioned such that there is no inhibition of engagement of the part-spherical inner surface portion of the cage with the part-spherical outer surface portion of the inner joint member.

Any clearance is easily accommodated in the preferred embodiment of the joint, wherein, as above referred to, the support surface is provided on a separate support member which is resiliently supported relative to the closure member secured to the outer joint member.

Because in such a joint the inner joint member is resiliently supported relative to the outer joint member, the engaging part-spherical surfaces of the inner and outer joint members and cage are always kept in contact with one another. The characteristics of the joint may be adjusted by selecting the required degree of resilience. To ensure correct engagement of the aforesaid part-spherical surfaces, the part-spherical internal surface of the cage and/or the internal part-spherical surface portion of the outer joint member may end before the cross-sectional plane of the respective joint member containing the centre of curvature of such surfaces.

To facilitate guiding of the balls at large angles of joint articulation, the cage may be provided, adjacent apertures in the cage wherein the balls are received, with outwardly or inwardly projecting nose formations.

The required contact between the cage and outer joint member is achieved by having the internal surface of the outer joint member, between the grooves thereof, provided firstly with its part-spherical surface portion at its end of smaller internal diameter, leading into a cylindrical surface which has a diameter at least as great as, and preferably greater, than the maximum diameter of the part-spherical surface portion.

Between the cylindrical internal surface of the outer joint member and the part-spherical surface portion thereof, there is preferably provided a frusto-conical transition surface.

Instead of providing a separate support member resiliently supported relative to the closure member, resilient support of the inner joint member relative to the outer joint member may be provided by the closure member being of resilient sheet metal and itself provided with the surface which engages the part-spherical end surface of the inner joint member.

When universal joints are used in motor vehicle drive lines, space is very often limited. Particularly, previously known universal joints which are able to accommodate relative axial movement (plunge) in addition to relative articulation are necessarily fairly large items.

Because a joint according to the present invention requires less space for a given torque capacity than certain previously known joints, the use of joints according to the present invention in a drive shaft can bring advantages.

A further aspect of the present invention therefore provides a drive shaft comprising two constant velocity ratio universal joints according to the first aspect of the present invention as above set forth, connected by an intermediate shaft element. The inner joint member of one of the joints is integral with the intermediate shaft element or is permanently connected to it, whilst the inner joint member of the other joint is provided with a bore into which the intermediate shaft or a journal connected to it extends, the inner joint member and shaft or journal being provided with circumferentially spaced longitudinally extending opposed pairs of guiding tracks, in each pair of which are received a number of rolling members, preferably balls.

Thus one of the universal joints accommodates plunge, by virtue of the permissible relative axial movement between the inner joint member and the intermediate shaft or journal connected thereto. Although the provision of the rolling members between the inner joint member and intermediate shaft or journal necessarily increases the radial dimension of the joint, it can nevertheless be smaller than that of conventional plunging constant velocity ratio universal joints.

Preferably the guiding tracks in the inner joint member are circumferentially offset relative to the grooves thereof.

BRIEF DESCRIPTION OF DRAWINGS

The invention will now be described by way of example with reference to the accompanying drawings, of which.

DESCRIPTION OF PREFERRED EMBODIMENTS

Figure 1:
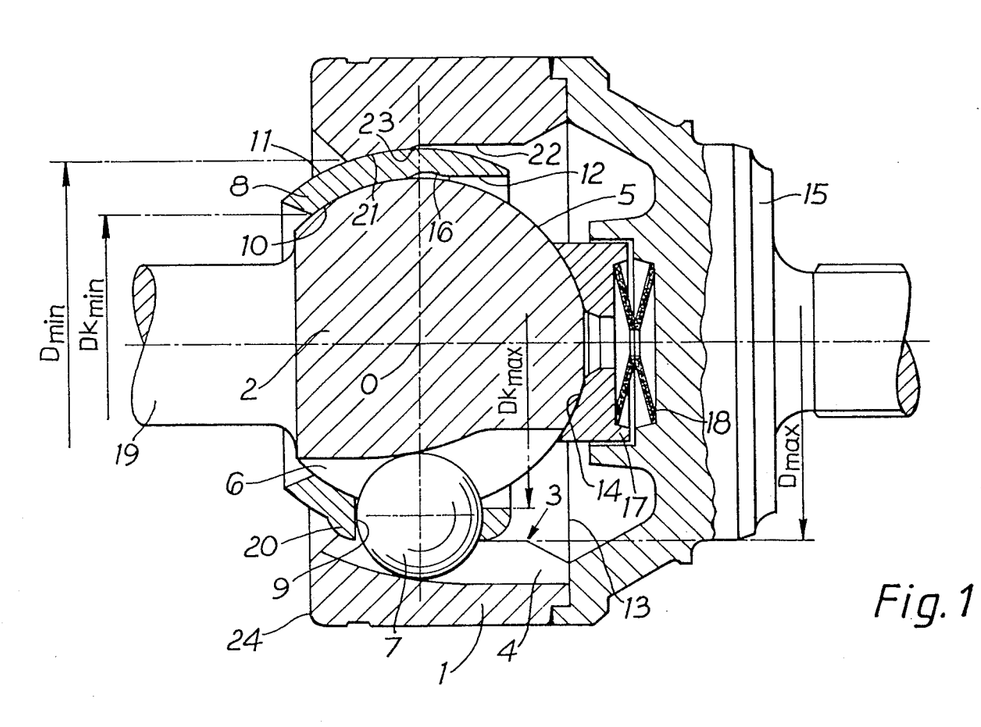
FIG. 1 is a longitudinal section through a first embodiment of constant velocity ratio universal joint according to the present invention.

Referring firstly to FIG. 1 of the drawings, the joint there shown comprises an outer joint member 1, an inner joint member 2, and a cage 8 therebetween. The outer joint member 1 is a hollow component, having an internal surface 3 in which are provided a number of circumferentially spaced, inwardly facing, grooves 4, extending in meridian planes about the axis of rotation of the outer joint member. One end, 13, of the outer joint member has annular engagement with, and is secured by welding (e.g. friction welding) to, a closure member 15, by which a torque transmitting connection is provided with a shaft element.

The configuration of the internal surface 3 of the outer joint member between the grooves thereof is that of a hollow part-spherical surface 21, at the end of the outer joint member away from the closure member 15. This part-spherical surface 21 leads into a cylindrical surface 22, by way of a short frusto-conical transition surface 23. The greatest internal diameter of the surface of the outer joint member between the grooves thereof is indicated as Dmax, this being the diameter of the cylindrical surface 22 at the end 13 of the joint member. Considered from the other end of the outer joint member in the direction towards the end 13 thereof, the part-spherical surface 21 ends before the plane, perpendicular to the axis of the joint member, containing the centre of curvature 0 thereof.

The grooves 4 in the outer joint member are of undercut-free configuration considered from the end 13 of the outer joint member.

The inner joint member 2 takes the form of a head integral with a journal or shaft element 19 for torque transmission with the inner joint member. The inner joint member is provided with a number of circumferentially spaced outwardly facing grooves 6 in meridian planes about the axis of rotation of the inner joint member, facing the grooves 4 in the outer joint member in pairs. Considered from the end of the inner joint member adjacent the larger internal diameter end 13 of the outer joint member, the grooves 6 in the inner joint member are of non-undercut configuration. As viewed in the longitudinal section of the drawing, the bases of the grooves 4, 6 in the outer and inner joint members each have arcuate portions, and the centres of curvature of the arcuate portions of the grooves in the outer joint member are offset relative to the joint articulation centre O. The centres of curvatures of the grooves in the inner joint member are offset on the other side of the joint articulation centre O.

A number of balls are received one in each facing pair of grooves 4, 6 for torque transmission between the joint members. The balls occupy window apertures 9 in an annular cage 8 which is received between the inner and outer joint members. The cage holds the balls with their centres in a common plane, and the above described offset of the centres of curvature of the arcuate portions of the grooves in the outer and inner joint members has the effect that when the joint is articulated the ball centre plane bisects the angle between the axes of rotation of the inner and outer joint members, thereby giving the joint constant velocity ratio characteristics.

The cage 8 has a part-spherical outer surface 11 which engages the part-spherical surface portion 21 inside the outer joint member. The inner surface of the cage comprises, starting from its end adjacent the other end 24 of the outer joint member, a part-spherical surface 10 concentric with the outer surface 11 of the cage. At this end of the cage, the minimum internal diameter of the cage is indicated at Dkmin. Towards the end of the cage adjacent the end 13 of the outer joint member of larger internal diameter, the part-spherical inner surface portion 10 of the cage leads into a cavity with a cylindrical surface 12, by way of an undercut relief 16. Apart from the relief 16, the inner surface of the cage is of non-undercut configuration considered from the end of the cage adjacent the larger internal diameter end 13 of the outer joint member.

Considered from the end of the cage of smaller diameter Dkmin, the inner part-spherical surface 10 of the cage ends before the plane, perpendicular to the axis of the cage, containing the centre of curvature of such surface. It will be appreciated that the joint centres of curvature of the concentric surfaces 10 and 11 of the cage define the articulation centre O of the joint. The fact that the surface 10 ends before the plane containing its centre of curvature, as does the part-spherical surface portion 21 of the outer joint member between the grooves thereof, means that when the joint is articulated there is no tendency for it to catch or become jammed.

The part-spherical outer surface 5 of the inner joint member between the grooves thereof also extends to the end of the inner joint member, although the inner joint member is truncated so that there is a small flat at its end. The part-spherical surface at the end of the inner joint member engages a complementary part-spherical surface 14 provided on a support member 17 which is itself carried by the closure member 15 and resiliently biased relative thereto by spring means 18, e.g. spring washers. The spring biasing of the support member 17 relative to the closure member 15 has the effect that the inner joint member is resiliently pressed towards the small diameter end 24 of the outer joint member, and clearance is taken up with the part-spherical surfaces of the joint members and cage held in the required engagement.

As an alternative to the provision as shown in FIG. 1 of a separate support member 17 spring biased relative to the closure member 15, the part-spherical surface 14 could be provided directly on the closure member 15. In this case, during assembly of the joint suitable shims could be disposed between the closure member and outer joint member before they are secured together, to achieve the required take up of manufacturing tolerances and elimination of axial play in the joint.

Also visible in FIG. 1 is the provision on the cage 8 of an outwardly projecting nose portion 20 adjacent each of the window apertures 9 in the cage wherein the balls 7 are received. This assists ball guidance at large angles of joint articulation. It will be appreciated that such nose formations extend into the grooves 4 in the outer joint member wherein the balls are received, so that they do not interfere with the engagement between the part-spherical outer surface of the cage and the internal part-spherical surface portion of the outer joint member between its grooves. In some joint geometries, inwardly extending nose formations may be provided in the interior of the cage.

During assembly of the joint, the configuration of the cage means that it can be passed over the inner joint member from the end thereof having the journal 19 without difficulty. Similarly the cage can enter the outer joint member from the end thereof having the larger internal diameter, whilst the balls are in the apertures in the cage. Over-articulation of joint members and cage relative to one another is not required. When thus assembled, the closure member 15 can be secured to the outer joint member 1, either directly if the support member 17 is spring biased relative to the connecting member, or with the interposition of suitable adjusting shims if there is no such spring biased support member.

This method of joint assembly means that the inner joint member is able to be integral with the journal 19 or a shaft element. Thus, the inner joint member can be of smaller size than if it had to accommodate a separate shaft member, and the pitch circle on which the balls 7 are disposed can be of relatively smaller diameter. Correspondingly larger balls 7 can thus be accommodated than in a joint where the inner joint member has to receive a separate shaft element. The torque capacity of the joint largely depends on the ball diameter.

Figure 2:
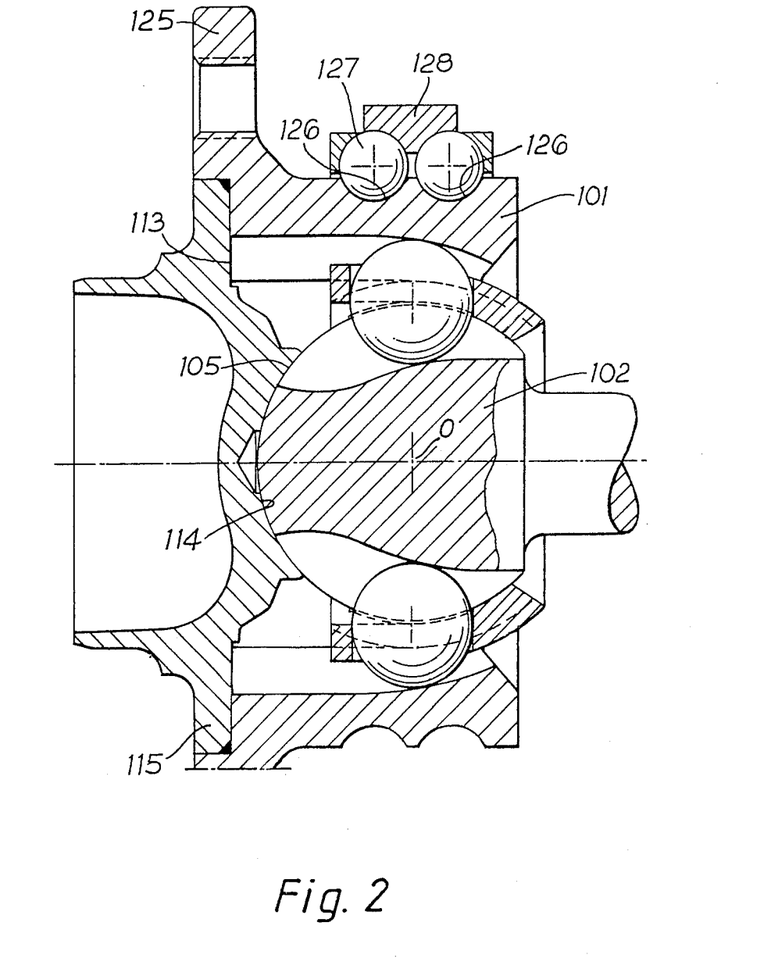
FIG. 2 is a longitudinal section through a further embodiment of joint according to the invention, forming part of an integrated wheel bearing assembly.

Referring now to FIG. 2 of the drawings, this shows a further embodiment of joint according to the invention, and parts of the joint corresponding to the parts in the FIG. 1 embodiment are accorded the same reference numerals but in the 100 series. The outer joint member 101 of the joint differs from that shown in the embodiment of FIG. 1 in that it is integral with a flange 125 for attachment of a vehicle wheel. Further, the outer joint member is provided on its exterior with grooves 126 which form the inner races of a double row ball bearing assembly having balls 127 and an outer bearing race 128. The outer bearing race may be designed as a flange or otherwise, for direct connection to a wheel carrier member or other part of a vehicle suspension. FIG. 2 also shows the radii of curvature of the curved parts of the bases of the grooves in the joint members.

At its end 113 of larger internal diameter, adjacent flange 125, the outer joint member 101 is closed by a member 115 which is accommodated in a recess in the outer joint member and connected to it by a welding process which does not heat the outer joint member as a whole to a high temperature and therefore does not introduce distortion. The member 115 has a part-spherical surface 114 which contacts the spherical surface 105 at the facing end of the inner joint member 102, without the interposition of a spring biased support member, and therefore the position of the closure member 115 relative to the outer joint member must be set so that axial play in the joint is eliminated before these components are welded together.

Figure 3:
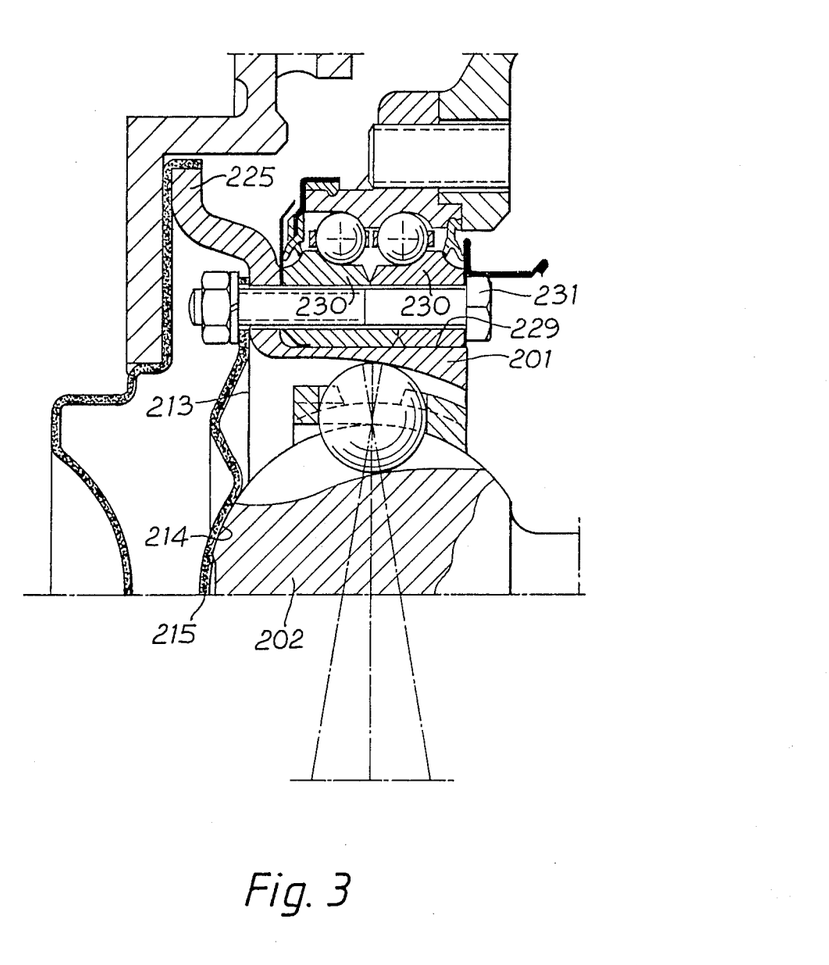
FIG. 3 is a section through an alternative embodiment to FIG. 2.

Referring now to FIG. 3 of the drawings, this shows a further embodiment wherein a joint according to the invention is applied to an integrated hub assembly for a drivable wheel of a vehicle. Once again, parts corresponding to parts of the previously described embodiments are accorded the same reference numerals but this time in the 200 series. In this embodiment, the outer joint member 201 is a thin walled component formed of sheet metal, reinforced where appropriate. The outer joint member has an external surface 229 on which are received separate inner bearing races 230 of a double row bearing assembly. The inner races 230 are held to the outer joint member by a plurality of bolts 231 spaced circumferentially therearound, extending through the races and through a flange part 225 extending from the end 213 of the outer joint member which has the larger internal diameter. In FIG. 3, the outer race of the bearing which supports the outer joint member is shown with a flange which is connected to a vehicle suspension component.

FIG. 3 also shows the radii of curvature of the bases of the curved parts of the grooves in the outer and inner joint members, and the offset of their centres of curvature to opposite sides of the plane containing the centre of the joint.

The bolts 231 also serve to secure to the outer joint member a closure member 215 which is of sheet metal and is shaped to provide a part-spherical surface 214 facing the inner joint member 202. The closure member 215 is designed to have sufficient resilience to act on the inner joint member in the same manner as the separate spring biased support member 17 in the embodiment of FIG. 1.

Figure 4:
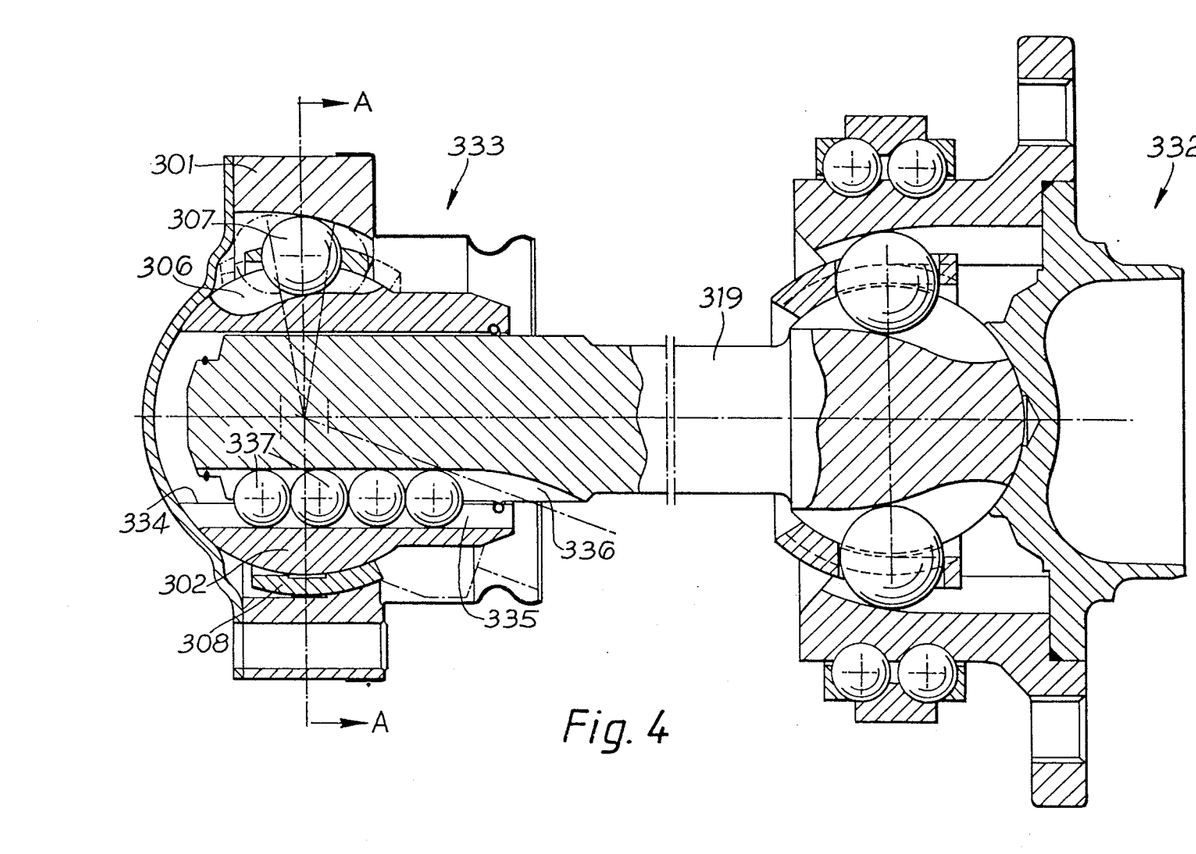
FIG. 4 is a longitudinal section through a drive shaft incorporating joints according to the invention.
Figure 5:
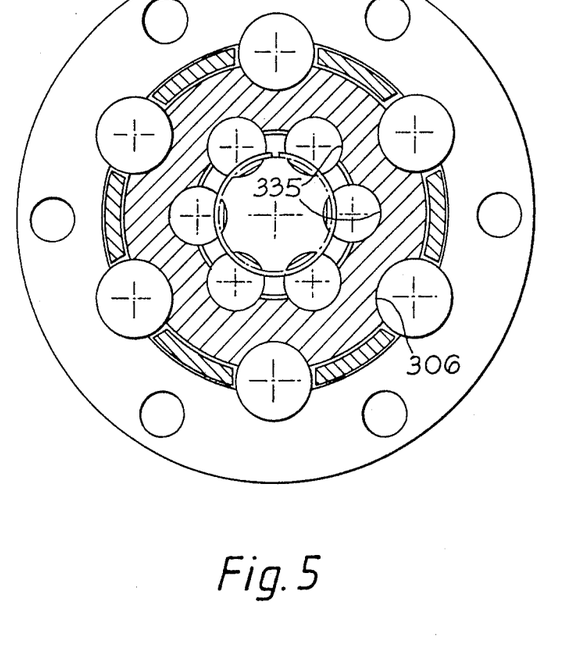
FIG. 5 is a section on the line A—A of FIG. 4.

Referring now to FIGS. 4 and 5 of the drawings, these show, with reference numerals in the 300 series, a drive shaft which is provided with two joints according to the present invention. The one joint 332 is the same as that shown in FIG. 2 of the drawings. The other joint 333 has an inner joint member whose external configuration in respect of its part-spherical surface and ball-receiving grooves is the same as that above described. The cage 308 and balls 307 are as above described. The outer joint member 301 has an internal configuration in respect of its part-spherical surface portion and ball-receiving grooves as above described.

The large diameter end of the outer joint member is closed by a sheet metal closure member engaging the inner joint member.

The inner joint member 302 of the joint 333 differs from the inner joint members in the joints above described in that it is hollow with an internal bore 334, and has a sleeve like extension. The bore 334 has a number of circumferentially spaced inwardly facing guiding tracks 335. It will be noted from FIG. 5 that the tracks 335 in the inner joint member are circumferentially offset from the ball-receiving grooves 306 thereof, so that the diameter of the inner joint member is kept to a minimum. An intermediate shaft member 319 extends into the bore 334 in the inner joint member, and is provided with outwardly facing guiding tracks 336 which face the tracks 335 in the inner joint member in pairs. Each facing pair of tracks 335, 336 receives a number of rolling elements, in this embodiment balls 337. The ability of the balls 337 to roll along the tracks 335, 336 means that the intermediate shaft member 319 is able to move axially relative to the inner joint member of joint 333, and there is a low frictional resistance to such axial movement. Suitable stops would, of course, be provided to limit the relative axial movement between the intermediate shaft member 319 and the inner joint member of the joint 333. The intermediate shaft member 319 is integral with the inner joint member of the joint 332. However, it will be appreciated that the intermediate shaft member could comprise two journals connected to each other with the intermediary of a thin-walled tube, these parts being welded together. One of such journals could be integral with the inner joint member of the joint 332.

I claim:

1. A constant velocity ratio universal joint for torque transmission, comprising:
    a hollow outer joint member having an internal surface with a number of grooves circumferentially spaced about the axis of rotation of the joint member and extending in meridian planes;
    an inner joint member disposed at least partially within the outer joint member and having an outer surface with a number of grooves circumferentially spaced about the axis of rotation of the joint member in meridian planes facing the grooves of the outer joint member in pairs, all the grooves in the joint members being undercut free;
    a plurality of balls received one in each facing pair of grooves in the joint members for torque transmission therebetween;
    the internal surface of the outer joint member between the grooves thereof being non-undercut, considered from one end of the member at which end the member has an internal diameter larger than at its other end, and including a part-spherical surface portion;
    the outer surface of the inner joint member between the grooves thereof having a part-spherical portion;
    and a cage of annular form disposed between the inner and outer joint members and having inner and outer part-spherical surface portions engaging said part-spherical surface portions of the inner and outer joint members, the cage holding the balls so that their centres occupy a plane guided to bisect the angle between the rotational axes of the inner and outer joint members; wherein:

the outer joint member is closed at said one end by a closure member;

the inner joint member, at its end adjacent said one end of the outer joint member, has a part-spherical end surface engaged by a complementary support surface provided in association with said closure member; and the inner surface of the cage comprises said part-spherical portion which is engaged with the part-spherical surface portion of the inner joint member adjacent its other end, and which leads into a cavity extending to the end of the cage adjacent said one end of the outer joint member, said cavity having a size at least equal to the maximum diameter of the part-spherical inner surface portion of the cage and being undercut free considered from said end.

2. A joint according to claim 1 wherein the inner joint member is integral with a journal element.

3. A joint according to claim 1 wherein the inner surface of the cage comprises a groove in a transition region between the part-spherical portion and the cavity thereof.

4. A joint according to claim 1, wherein said support surface is provided on a separate support member, and there is provided resilient means operative between the support member and closure member for pressing the inner joint member so that its spherical outer surface contacts the inner part-spherical surface of the cage and so that the outer part-spherical surface of the cage contacts the part-spherical surface portion of the internal surface of the outer joint member.

5. A joint according to claim 1 wherein at least one of the part-spherical inner surface portion of the cage and the internal part-spherical surface portion of the outer joint member ends, in the direction towards said one end of the outer joint member, before a cross-sectional plane of the respective joint member containing the centre of curvature of such surface.

6. A joint according to claim 1 wherein the cage has apertures wherein the balls are received and is provided, adjacent such apertures, with outwardly or inwardly projecting nose formations.

7. A joint according to claim 1 wherein the internal surface of the outer joint member comprises said part-spherical portion at the other end of the joint member, which is followed towards said one end of the joint member by a cylindrical surface having a diameter at least as great as the maximum diameter of said part-spherical surface portion.

8. A joint according to claim 7 comprising a frusto-conical transition surface between said part-spherical surface portion and cylindrical surface.

9. A joint according to claim 1 wherein said closure member comprises a resilient sheet metal component provided with said complementary support surface.

10. A joint according to claim 1 further comprising:
a bore defined in the inner joint member;
a shaft member extending into said bore;
a number of circumferentially spaced guide tracks provided in the inner joint member;
a number of circumferentially spaced guide tracks provided in the shaft member, facing the guide tracks in the inner joint member in pairs; and
a plurality of rolling members received in each pair of said guide tracks.

11. A joint according to claim 10 wherein said guide tracks in the inner joint member are circumferentially offset from said grooves thereof.

12. A drive shaft, comprising:
a first constant velocity ratio universal joint for torque transmission, including,
a first hollow outer joint member having an internal surface with a number of grooves circumferentially spaced about the axis of rotation of the first outer joint member and extending in meridian planes.
a first inner joint member disposed at least partially within the first outer joint member and having an outer surface with a number of grooves circumferentially spaced about the axis of rotation of the first inner joint member in meridian planes facing the grooves of the first outer joint member in the pairs, all the grooves in the first joint members being undercut-free,
a first plurality of balls received one in each facing pair of grooves in the first joint members for torque transmission therebetween,
the internal surface of the outer first joint member between the grooves thereof being non-undercut, considered from one end of the first member at which end the first member has an internal diameter larger than at its other end, and including a part-spherical surface portion,
the outer surface of the first inner joint member between the grooves thereof having a part-spherical portion, and
a first cage of annular form disposed between the first inner and first outer joint members and having inner and outer part-spherical surface portions engaging said part-spherical surface portions of the first inner and first outer joint members, the first cage holding the first balls so that their centers occupy a plane guided to bisect the angle between the rotational axes of the first inner and first outer joint members, the first outer joint member being closed at said one end by a first closure member, the first inner joint member, at its end adjacent said one end of the first outer joint member, having a part-spherical end surface engaged by a complimentary support surface provided in association with said first cage including said part-spherical portion which is engaged with the part-spherical surface portion of the first inner joint member adjacent its other end, and which leads into a cavity extending into the end of the first cage adjacent said one end of the first outer joint member, said cavity having a size at least equal to the maximum diameter of the part-spherical inner surface portion of the first cage and being undercut-free considered from said end;
a second constant velocity ratio universal joint for torque transmission, including,
a second hollow outer joint member having an internal surface with a number of grooves circumferentially spaced about the axis of rotation of the second outer joint member and extending in meridian planes,
a second inner joint member disposed at least partially within the second outer joint member and having an outer surface with a number of grooves circumferentially spaced about the axis of rotation of the second inner joint member in meridian planes facing the grooves of the second outer joint member in the pairs, all the grooves in the second joint members being undercut-free, a second plurality of balls received one in each facing pair of grooves in the second joint members for torque transmission therebetween, the internal surface of the second outer joint member between the grooves thereof being non-undercut, considered from one end of the second member at which end the second member has an internal diameter larger than at its other end, and including a part-spherical surface portion, the outer surface of the second inner joint member between the grooves thereof having a part-spherical portion, a second cage of annular form disposed between the second inner and second outer joint members and having inner and outer part-spherical surface portions engaging said part-spherical surface portions of the second inner and second outer joint members, the second cage holding the second balls so that their centers occupy a plane guided to bisect the angle between the rotational axes of the second inner and second outer joint members, the second outer joint member being closed at said one end by a second closure member, the second inner joint member, at its end adjacent said one end of the second outer joint member, having a part-spherical end surface engaged by a complementary support surface provided in association with said second closure member, and the inner surface of the second cage including said part-spherical portion which is engaged with the part-spherical surface portion of the second inner joint member adjacent its other end, and which leads into a cavity extending into the end of the second cage adjacent said one end of the second outer joint member, said cavity having a size at least equal to the maximum diameter of the part-spherical inner surface portion of the second cage and being undercut-free considered from said end, and further including, a bore defined in the second inner joint member, a shaft member extending into said bore, a number of circumferentially spaced guide tracks provided in the shaft member, facing the guide a number of circumferentially spaced guide tracks provided in the shaft member, facing the guide tracks in the second inner joint member in pairs, a plurality of rolling members received in each pair of said guide tracks; and an intermediate shaft element integral with the first inner joint member of said first joint and forming said shaft member extending into said bore of the second inner joint member of said second joint.

* * * * *